United States Patent [19]
Breyer et al.

[11] Patent Number: 4,835,718
[45] Date of Patent: May 30, 1989

[54] METHOD AND MEANS FOR CONTROLLING A COORDINATE-MEASURING INSTRUMENT

[75] Inventors: Karl-Hermann Breyer, Heidenheim; Karl Schepperle; Bernd Georgi, both of Oberkochen; Martin Wimmer, Steinheim, all of Fed. Rep. of Germany

[73] Assignee: Carl-Zeiss-Stiftung, Heidenheim/Brenz, Oberkochen, Fed. Rep. of Germany

[21] Appl. No.: 71,855

[22] Filed: Jul. 10, 1987

[30] Foreign Application Priority Data

Jul. 12, 1986 [DE] Fed. Rep. of Germany ....... 3623602

[51] Int. Cl.$^4$ .................... G06F 15/46; G01B 5/20
[52] U.S. Cl. .................... 364/560; 364/513; 364/474.35; 33/503; 33/504; 901/44; 901/46
[58] Field of Search ............ 364/168, 170, 475, 513, 364/560–561, 571, 474.35; 33/503–505, 1 M, 550, 551, 555, 556; 318/567–570; 901/9, 10, 44, 46; 377/17, 44

[56] References Cited

U.S. PATENT DOCUMENTS

| | | | |
|---|---|---|---|
| 4,118,871 | 10/1978 | Kirkham | 364/560 |
| 4,415,967 | 11/1983 | Russell | 364/168 |
| 4,472,782 | 9/1984 | Suzuki | 33/505 |
| 4,575,791 | 3/1986 | Schwefel | 364/168 |
| 4,653,011 | 3/1987 | Iwano | 364/560 |
| 4,679,159 | 7/1987 | Yamazaki et al. | 364/560 |
| 4,713,517 | 12/1987 | Kinoshita | 318/570 |

*Primary Examiner*—Parshotam S. Lall
*Assistant Examiner*—Ellis B. Ramirez
*Attorney, Agent, or Firm*—Hopgood, Calimafde, Kalil, Blaustein & Judlowe

[57] ABSTRACT

In the automated performance of multiple measurements on each of a succession of workpieces, the invention contemplates establishing a plurality of safety-reference positions ($S_1$ to $S_7$) along the programmed displacement path intended for the probe head (10) and its work-contacting probe pin. Any one of a variety of error signals developed in the course of conducting the measurement program on a given workpiece is operative to temporarily stop further conduct of the program and to instigate a repeated attempt to successfully traverse the part of the program in which the error signal occurred. The repeated attempt involves retracting displacement of the probe head back to the most-recently traversed safety-reference position, and if the repeated attempt produces the same error signal the probe head is returned to the most-recently traversed safety-reference position and is then caused to by-pass the error-signal part of the program by displacement to a succeeding safety-reference position, for completion of the remaining fraction of the measurement program on the given workpiece.

18 Claims, 3 Drawing Sheets

METHOD AND MEANS FOR CONTROLLING A COORDINATE-MEASURING INSTRUMENT

BACKGROUND OF THE INVENTION

The present invention relates to a method for the automatic control of coordinate-measuring instruments and to means for carrying out the method.

Coordinate-measuring instruments are being increasingly used in repeated cycles of multiple measurement operations upon a massed succession of workpieces, for example under CNC control, during an unmanned night shift and without supervision by operating personnel, the massed succession being a large number of workpieces clamped on the machine table or fed continuously to the machine via a work-handling system. To control such an operation, a computer is loaded with a work program and continuously issues various other technical commands to the measurement machine; illustratively, these commands concern the probe-pin combination or configuration to be substituted, the contact force selected for the measurement, etc. And the computer receives and stores the measured coordinate values and status reports from the control electronics of the measurement machine.

If disturbance or interruption occurs during such an automatic CNC-controlled operation, an error signal can develop if the probe head has collided with an obstacle or if a correct measurement value cannot be retaken, due to too short an approach path or to a dirty surface of the workpiece. In accordance with the previously known state of the art, the CNC operation is interrupted upon the occurrence of such an error event, a warning signal is given, and the machine must be restarted manually by the operator after the error has been eliminated. Such interruptions in operation are undesirable since a measurement job can be thereby delayed for several hours.

BRIEF STATEMENT OF THE INVENTION

The object of the present invention is to provide a method for the automatic control of coordinate-measuring instruments whereby machine-dependence upon the operator is greatly reduced, particularly in the event of disturbances or program interruptions.

The invention achieves this object by introducing predetermined safety or reference positions ($S_1$ to $S_7$) in the measurement program of a coordinate-measuring machine. Specifically, these safety positions are located to provide reference points along the programmed path of displacement of the probe head or work-contacting ball tip, and error messages given off during the course of the measurement program activate a control module which repeats the most-recent measurement procedure. In the event that the error message is repeated, the control module moves the probe head back to one of the safety (reference) positions ($S_1$ to $S_7$) which have already been passed and, from there, to another such position ($S_1/S_5-S_7$), so as to omit measurement at an upcoming measurement point ($Z_5$), or at a plurality of measurement points ($Z_5-Z_8$) on a structural feature of the workpiece, or at all remaining measurement points on the workpiece.

In the case of a work-contacting problem, the measurement point is re-approached, as with modified control parameters such as, for example, greater contacting speed and/or reduced measurement force, so that a correct retaking of the measurement value can in many cases still be obtained, thus avoiding error messages which could lead to shut-down of a machine. Said measures can successfully overcome an error (disturbance) condition, as for example in the event that adequate signal intensity is not developed in the work-contact pulse because the work-approach speed is too low, or because the workpiece surface is yieldable, or because the trigger pulse from the probe pin has come too late due to a probe pin that has been bent because the measurement force was set too high.

Errors in measurement position are frequently due to positioning inaccuracies in the control circuits of the machine control, but such errors can be eliminated by renewed approach to a given measuring point, from a defined reference position.

In the event of a disturbance which cannot be eliminated, due, for example, to the fact that a given feature of the workpiece has not been machined or is even absent, or if the programmed path of the probe head causes a collision with a feature which has not been taken into account, then this error will recur at the same place during the renewed approach. Since the control module then moves the probe head directly to the next reference position and by-passes the corresponding feature on the workpiece, the measurement task is at least partially performed; there is no interruption of the measuring process, and machine shut-down is avoided.

It is preferred that the various reference positions be assigned different priority levels, at least one of which causes direct transfer of measurement operations to the next workpiece to be measured. Assurance is thus had, among other things, that indispensable measurement points cannot be bypassed; an indispensable measurement point is, illustratively, a point required for calculation of the coordinate system for each individual workpiece. If an error prevents the measurement of such an indispensable position, then further measurement on the entire workpiece will be by-passed, so that the machine will not make superfluous measurements on features which are no longer relevant.

It is advantageous if the control module is caused to introduce "help" routines which are dependent on the type of error, before causing repeated approach to a measurement position which has encountered an error message. In the case of a probe head which relies on electrical-switch closure to certify probe-pin seating, such a "help" routine can develop a trigger signal, from detected failure of the switch to close, and the trigger signal can initiate a mechanical impact or shock to the probe head. Electromagnetic means for delivering such a mechanical impact or shock to the probe head or in the vicinity of its suspension is described in another patent application filed on even date herewith, under the title "Probe Head With Self-Contained Electrical Switch Operated Means for a Coordinate-Measuring Machine" [Attorney File 7043].

Another "help" routine which can be performed before moving back to a reference position can apply in the case of a "collision" which is detected at offset from the surface of the workpiece; in such case, the measurement point is again and immediately approached without any change in the control parameters. With this technique, one can eliminate at least some of the so-called non-intrinsic disturbances which have no systematic cause but occur at random. Such non-intrinsic disturbances can, for instance, be "air contacts", in which, due to transient vibration in the building edifice, or to too great acceleration of a machine drive, in combination with relatively great mass of the involved probe pin, a trigger pulse is generated which has the appearance of a contacting or collision event.

The control module which introduces the above-described disturbance-instigated measures can be contained in a software program loaded in the computer of the measurement machine. However, it is also possible to develop the control module as "firmware" and, in particular, to include it in the form of a correspondingly programmed microprocessor in the control electronics of the coordinate-measuring instrument.

DETAILED DESCRIPTION

The invention will be illustratively described in detail, in conjunction with the accompanying drawings, in which.

Figure 1:
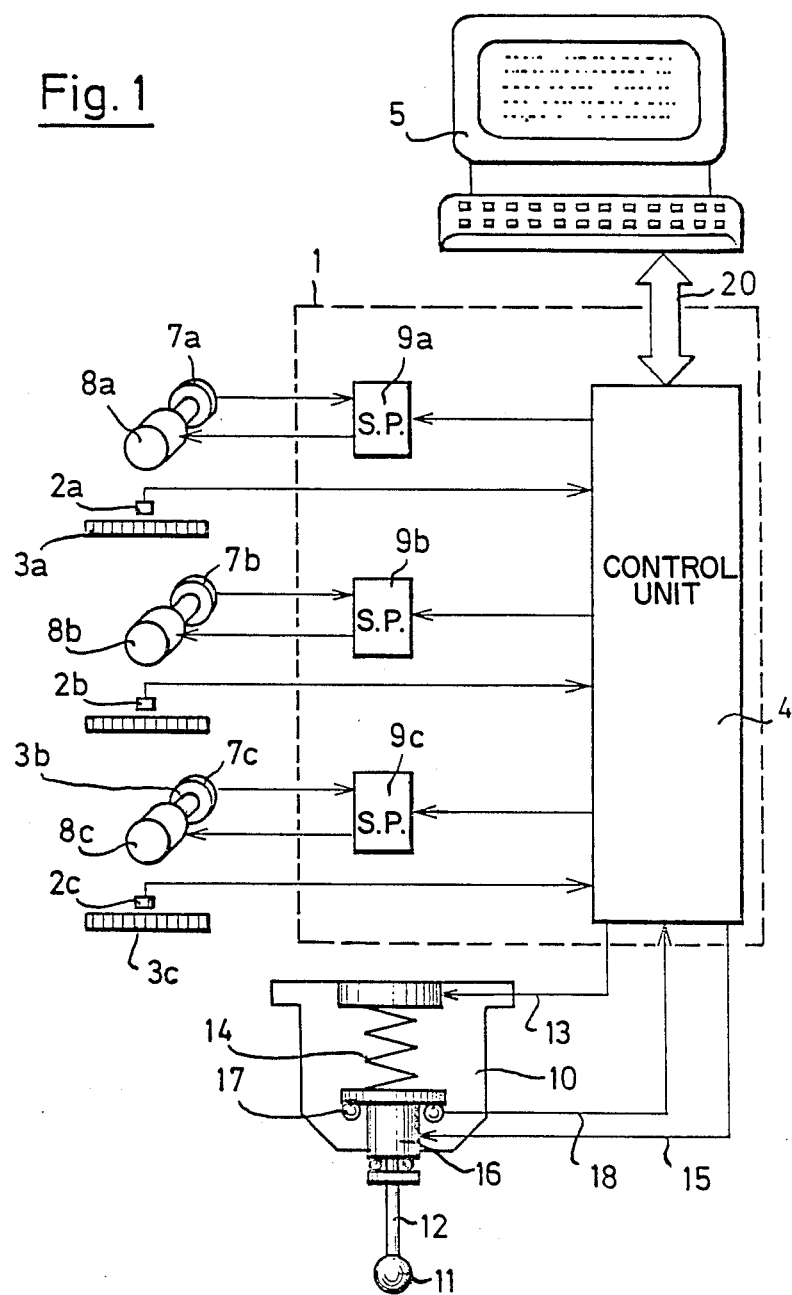
FIG. 1 is a block diagram of components for controlling a multi-coordinate measuring instrument.

In the block diagram of FIG. 1, control electronics of a coordinate measuring instrument are shown within an enclosure 1. The heart of the control electronics 1 is a control unit 4 which consists of microprocessors and is connected via a data bus 20 to a computer 5 which has been programmed by the user; from bus 20, computer 5 receives position data and other technical data for a given measurement program to be executed. Using data received from the computer, the control unit 4 calculates, inter alia, the desired velocity values $v_x$, $v_y$ and $v_z$ for velocity-control circuits of the respective drives of the machine, in three traversable coordinate-measurement axes. Each of these control circuits consists of a drive motor 8 with attached tachometer/generator 7 and output signal-processing (S.P.) electronics 9 which complete the control circuit. A probe head 10 is moved by the motors (8a to 8c) to the measurement positions established in the computer 5; the probe head 10 carries a deflectable probe pin 12 having a work-contacting ball tip 11.

The position of the probe head 10 in the coordinate system of the machine is measured via three measurement scales (3a to 3c), associated with the respective measurement axes X, Y and Z. In so doing, signal transmitters (2a to 2c) which read the measurement scales are also each connected to the control unit 4 as part of a separate position-control circuit.

The probe head 10 includes electrical switch-contact means associated with its mounting of the probe pin 12, and the contact means 17 is connected via a line 18 to the control unit 4. The contact means 17 opens upon work-contacting deflection and supplies a contact or coincidence-identifying pulse, in verification of another work-contacting pulse generated by sensitive piezoelectric sensing means (not shown, but as described, for example in U.S. Pat. No. 4,177,568) in probe pin 12. Control unit 4 responds to work contact by storing the instantaneous coordinate values of the measurement scales, and these data are delivered as measurement output to the computer 5.

Control unit 4 has additional lines of connection to the probe head 10. Via a line 15, an electromagnetic component 16 forming part of a probe-pin-changing device (as described, for example, in U.S. Pat. No. 4,637,119) can be excited by the control unit 4. And another line 13 will be understood to be operative to control a device for adjusting the measurement force of probe pin 12, namely, the compliant preloading of contact means 17, here symbolized by a spring 14.

Figure 2:
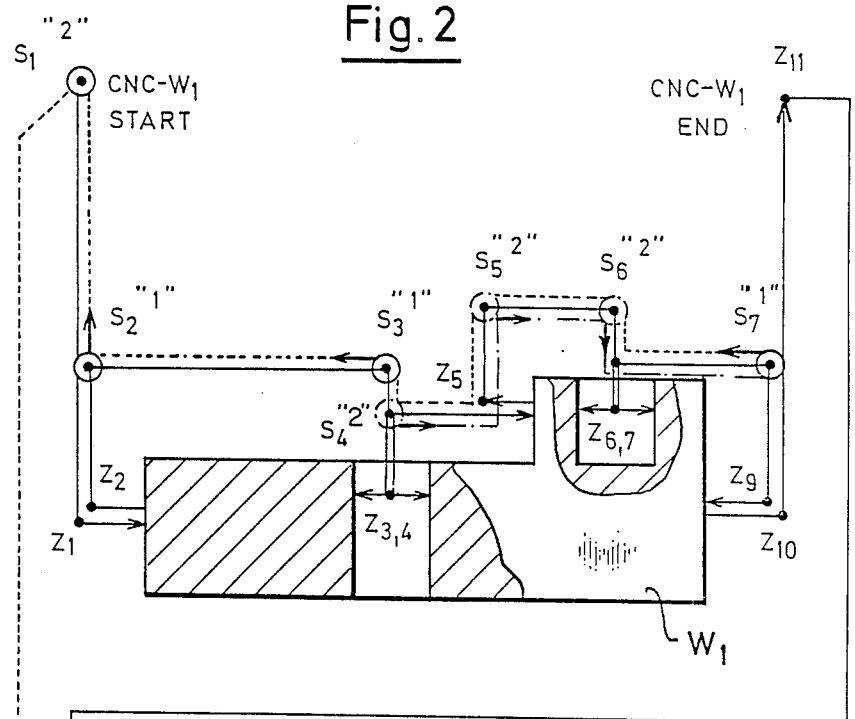
FIG. 2 is a diagram which shows in simplified manner the path traversed in the course of measuring a typical workpiece.
Figure 2:
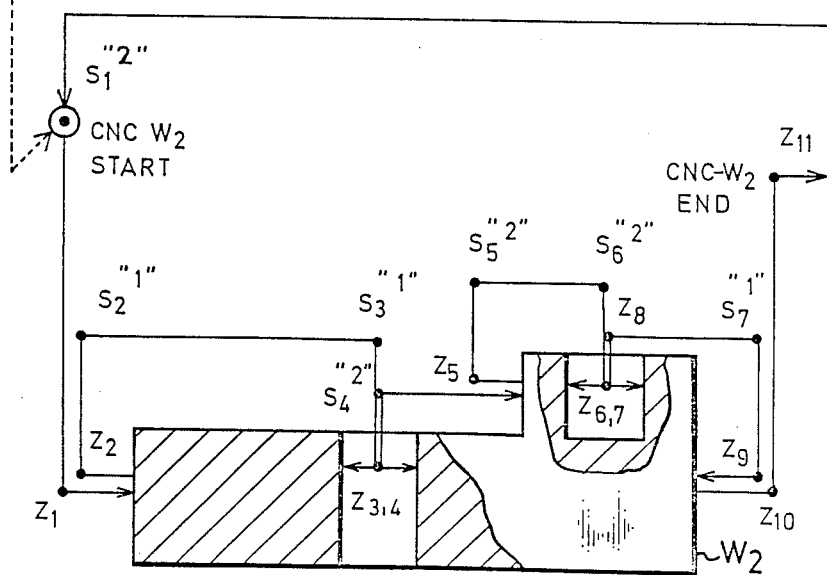

FIG. 2 diagrammatically illustrates a typical path of movement for probe head 10 (i.e., the work-contact ball 11 of its probe pin 12) in the course of a program of measuring two similar typical workpieces $W_1$ and $W_2$. For simplicity, the showing is limited to rectilinear displacements in a vertical plane passing through the workpieces $W_1$ and $W_2$, namely, an X–Z plane. However, it is to be understood that as a rule the path of movement for a measurement job involves varying degrees of complexity of displacement in all three coordinate directions X, Y and Z.

At commencement of the measurement program of FIG. 2, probe head 10 is moved to a first intermediate position $Z_1$ at offset from the front side of the workpiece $W_1$. From there, the front side is contacted at different places, and from the points of contact a determination is made of the position in space of the surface defined by said points. Thereupon, via points ($Z_2$, $S_2$ and $S_3$) of change in displacement direction, a position $Z_3$, $Z_4$ is reached, within a bore, the diameter of which is to be determined; at the same time, the bore-axis location is ascertained and interpreted in relation to the previously measured area, as a necessary step in determining the workpiece-coordinate system. After movement out of the bore and to a point $S_4$, the probe pin is moved horizontally until its ball tip 11 contacts another vertical surface, being a feature of an upper part of the workpiece $W_1$. After this vertical surface has been contacted and the tip 11 of the probe pin retracted to point $Z_5$, displacement proceeds vertically up to point $S_5$, horizontally to point $S_6$, and then vertically down to the position $Z_6$, $Z_7$ in a second bore in the workpiece $W_1$. After taking measurement values in this bore, the probe head passes, via an intermediate retracted position $Z_8$ to successive positions $S_7$ and $Z_9$ behind the rear face of the workpiece $W_1$, for further verifying contacts with the rear face. After making these contacts, the probe head retracts horizontally to point $Z_{10}$, and then vertically up to point $Z_{11}$, at which point the measurement program for workpiece $S_1$ is at an end. For reasons of safety, the points $S_1$ and $Z_{11}$ will be understood to lie far above the workpieces to be measured, so that at this elevation, the probe head and its probe pin can be moved readily over the shortest path to the starting point $S_1$ for a similar program of measurement on the next workpiece $W_2$.

In prior art practice wherein the above-described program is part of a CNC operation, a disturbing event, as for example a collision with the workpiece (or a so-called "air-contact", meaning failure to make a programmed work-contact event), would necessarily interrupt and therefore stop the CNC operation. Other possible occasions for such shut down of the CNC operation could also arise from failure to retake a given measurement (through recycling the program), in the event that the expected switch-contact pulse is not developed in line 18 to the control unit 4.

In accordance with the method of the invention, the user provides so-called safety or reference positions in the intended course of a given program. In the example shown in FIG. 2, these are the encircled points designated "S", further identified with different numerical designations of priority levels, "1" and "2". Priority level "1" means that the probe head is to be retracted back to the nearest safety position in case of a disturbing event, while priority level "2" causes forward displacement to the next safety position. The value "1" is illustratively entered into the program, for situations in which the next measurement point is indispensable for the involved workpiece, as for example because the position of the workpiece must be calculated from the particular measurement. The value "2" can be assigned when it is permissible to omit the next measurement point of the program.

These safety or reference positions and their corresponding priority designations will be understood to have been marked by the user, for each of the successive positions to be measured, the marking entries being stored in the computer 5, for example within the course of a single test run. Upon passing of a safety position, the computer 5 reports to the control unit 4 the presence and the priority level of the safety position. If a disturbance such as a collision, etc. should then occur during the measurement program, the control unit 4 will interrupt the course of the measurement and initiate one or more "help" measures, including inter alia:

1. Repetition of the most recent measurement procedures, illustratively from the most recent safety position and with different values of certain parameters, such as contact force or contact speed;
2. In case the error message is repeated at the same location, returning to the last safety position; and
3. In the event of a priority-level "1" involvement, moving back on the programmed path to the starting point $S_1$ and passing thence over to the next workpiece ($W_2$), or in the event of a priority-level "2" involvement, advancing further to the next safety point, while omitting intermediate measurement points.

Figure 3:
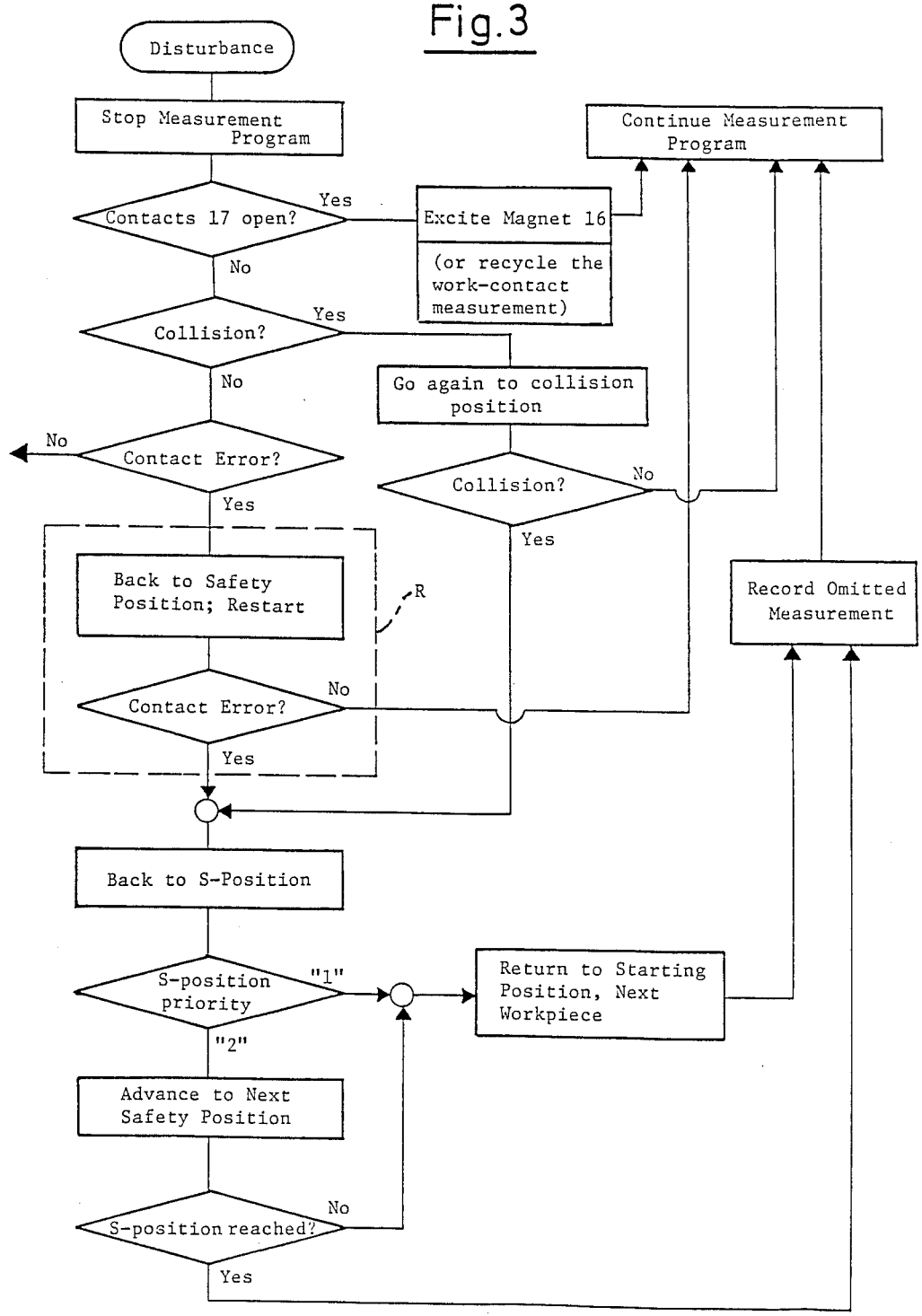
FIG. 3 is a flowchart of a "help" program which is executed in the event of a disturbance noted by a control unit of FIG. 1.

The above-described illustrative steps proceed, once the corresponding control module in the control unit 4 has been activated by the error message, and in accordance with a fixed routine; a flow-chart of such a routine is provided in FIG. 3. For better understanding, this routine will be described for several examples and with reference to FIG. 3 and FIG. 2.

EXAMPLE 1

Let us assume that, in the course of probing the front surface of the workpiece $W_1$, and that in retracting from work contact (i.e., in the direction toward $Z_2$), the switch contact in the probe head has remained open. This disturbance causes the corresponding module in control unit 4 (a) to stop the measurement program, (b) to inquire as to the status of the switch contact and (c) if the latter is open, to deliver a brief excitation pulse to magnet 16 of the probe-pin-change device; the switch contact closes, from resulting mechanical vibration. The disturbance is thus eliminated, and the measurement program continues. If the probe head of the measuring machine does not have a probe-pin-change device, then the front surface is again approached, as a result of which the probe pin is again deflected; upon probe-pin retraction, the switch contact closes, thus signifying that the error has been eliminated, and the measurement program continues.

EXAMPLE 2

Let us assume that there is an obstacle between positions $S_2$ and $S_3$. In such case, inquiry as to an open-switch contact is answered in the negative but, on the other hand, the unexpected contact pulse (i.e., the collision-induced contact pulse, not provided for this part of the program) leads to a "yes" output in the "Collision?" decision block next worked by the program. The control module now initiates a second approach to the collision position. If the same error no longer occurs at this location, then a so-called "air contact" was involved, i.e., the "collision" contact pulse was the result, for example, of a spurious mechanical shock in the machine bed; this being the case, no true collision has occurred, and the measurement program will continue further. However, since in this example, it is assumed that an obstacle actually is present in the path between $S_2$ and $S_3$, the contact pulse will recur at the same place, so that the control module will now move the probe head back to the last-traversed safety-reference position, i.e., to $S_2$, and inquiry is made as to its priority level. The priority "1" was established for safety position $S_2$ because the bore measurements ($Z_3$, $Z_4$) are absolutely necessary for determining the position of the workpiece; the involved priority "1" thus effects (a) return of the probe head from position $S_2$ to the starting position $S_1$ and (b) further probe-head displacement along the path shown in dashed line, and in a plane well above the workpieces $W_1$ and $W_2$, directly to $S_1$ position for the next workpiece $W_2$. The measurement program then proceeds with the described program of measurement, for workpiece $W_2$, and indication of the omission of workpiece $W_1$ is caused to appear in the measurement record produced by the computer 5.

EXAMPLE 3

Let us assume that the programmed cycle of contact with the front surface of the upwardly projecting part of the workpiece $W_1$ (e.g., horizontally to the rear, from safety position $S_4$) does not provide any usable measurement results; for example, the work-contact pulse may be absent because this surface is too shifted (i.e., not within positional tolerance) due to poor machining, or because this upwardly projecting part is entirely missing, or because the overlying element consists of a different material which is unsuited to the currently adjusted workcontacting parameters (measurement force, contacting speed). Such errors give rise to a "yes" output at the third or "Contact error?" decision block; this being the case, the program module now moves the probe head back to the safety position $S_4$, and the measurement point is re-approached several times, each time with changed parameters. This repetition loop is marked R in the flow-chart of FIG. 3. If the re-approach is successful, then the measurement program continues. However, if the same contact error occurs again and again, then the control module moves the probe head back to safety positon $S_4$. Ensuing inquiry as to its priority level results in the value "2" and effects probe-head displacement directly from $S_4$ to the next safety position $S_5$; and, as soon as position $S_5$ is reached, the measurement program continues, it being recorded that the measurement sought from $Z_5$ has been omitted. If, however, a further disturbance occurs during the direct passage from $S_4$ to $S_5$ and if the safety position $S_5$ is therefore not attained, then the probe head is returned along the path defined by safety positions which have thus far been traversed, back to the initial position $S_1$, and from that point over to the next workpiece $W_2$. In this case also, an entry is made in the measurement record for workpeice $W_1$ to identify the omitted measurement points.

What is claimed is:

1. The method of controlling probe displacement in a coordinate-measuring machine that is programmed for successive measurement subroutines in a mass-measurement operation, wherein the machine uses a control unit which produces an error signal in the event of a machine disturbance, said method comprising the steps of:

determining, prior to commencement of operations pursuant to a predetermined measurement program, safety-reference positions ($S_1$ to $S_7$) along the path of probe displacement pursuant to said program, and introducing said positions into the predetermined measurement program;

monitoring for error signals produced in the course of a given subroutine, and, upon occurrence of an error signal, interrupting the program by repeating the most-recently performed measurement subroutine; and in the event of a repeated occurrence of the error signal, moving the probe (10) back to one of the already-traversed safety-reference positions ($S_1$ to $S_7$), and thence moving the probe to another safety-reference position ($S_1/S_5$–$S_7$), thus causing the machine to omit at least the subroutine for the measurement point ($Z_5$) involved with the error signal.

2. The method of claim 1, wherein the mass-measurement operation is upon successive workpieces ($W_1$, $W_2$), comprising the further step of preestablishing safety-reference positions of different priority level ($S"1"$, $S"2"$), at least one of the priority levels ($S"2"$) being programmed to cause probe displacement to the next-succeeding safety-reference position in the event that a structural feature of a given workpiece ($W_1$) cannot be measured despite repetition.

3. The method of claim 1, wherein, upon moving the probe to another safety-reference position, the machine is caused to omit multiple measurement subroutines ($Z_5$–$Z_8$) on a structural workpiece feature involved with the error signal.

4. The method of claim 1, wherein, in the event of contact errors the repetition of the measuring process takes place with modified control parameters and from the most recently traversed safety position ($S_4$ "2").

5. The method of claim 1, wherein, before repetition of a measurement procedure which has encountered an error signal, additional measures which are a function of the type of involved error are introduced by the control unit.

6. The method of claim 5, wherein, in the event that a switch contact (18) in the probe (10) has remained open, the additional measure resides in exerting a mechanical impact blow on the probe.

7. The method of claim 1, wherein the mass-measurement operation is upon successive workpieces ($W_1$, $W_2$), comprising the further step of preestablishing safety-reference positions of different priority level ($S"1"$, $S"2"$), at least one of said priority levels ($S"1"$) being programmed to cause displacement of the probe to the next-succeeding workpiece ($W_2$) to be measured in the event that a structural feature of a given workpiece ($W_1$) cannot be measured despite repetition, thereby, in said event, omitting all remaininig measurement points on said given workpiece ($W_1$).

8. The method of claim 7, wherein probe displacement to the next workpiece ($W_2$) takes place along a programmed path which avoids workpiece contact and which avoids the safety-reference positions which have already been traversed in measuring the involved workpiece ($W_1$).

9. The method of claim 7, wherein probe displacement to the next workpiece ($W_2$) takes place backwards along a programmed path through the safety-reference positions which have already been traversed in measuring the involved workpiece ($W_1$).

10. The method of any one of claims 4, 5, 6 or 9, wherein the control module causes an entry within the measurement log which identifies any measurement positions which have been omitted.

11. In a coordinate-measuring machine wherein a probe head has electrical-switch means for indicating at-rest positional reference of a probe pin that is deflectably mounted to the probe head, and wherein a path of probe-head displacement is controlled by computer means with a program to accomplish a predetermined succession of probe-head advances to successive positions from each of which the probe pin is subjected to a measurement cycle of displacement into and retraction from the involved location of workpiece contact, and wherein said program defines a relatively narrow tolerance range of coordinates within which each work-contacting measurement must be made, the improvement wherein said program produces an error signal responsive to a failure of said electrical-switch means to indicate said at-rest positional reference at any time that said probe head is outside said relatively narrow tolerance range for any of the work-contacting measurements of the program, said program being responsive to said error signal for initiating at least an attempted repetition of the involved measurement cycle.

12. The improvement of claim 11, wherein the narrow tolerance range of coordinates within which to make each work-contacting measurement is at least slightly wider than the anticipated range of work-contacting coordinates to be measured, said program producing a different error signal in the event of failure of said electrical-switch means to indicate said at-rest positional reference at a point in time when said probe head is within said relatively narrow tolerance range of coordinates, and means responsive to said different error signal for applying a transient mechanical shock to said probe head prior to initiating an attempted repetition of the involved measurement cycle.

13. The improvement of claim 11, in which said program produces a different error signal in the event that said electrical-switch means fails to operate within a predetermined relatively narrow range of coordinates within which work-contacting probe-pin deflection is anticipated, and means responsive to said different error signal for establishing a change of feed speed for said probe head and for repeating the involved measurement cycle at the changed speed of probe-head advance into work-contacting relation.

14. The improvement of claim 11, in which said computer means includes means for logging data generated in the course of measurements made along said path for a given workpiece, said program being operative to log the location and nature of any error signal produced in said course.

15. The improvement of claim 11, in which said program is implemented by a unit of firmware responsive to said error signal and for control of repetition of the involved measurement cycle.

16. The improvement of claim 11, wherein said program establishes a safety-reference point at each of the successive positions from which a measurement cycle of displacement into workpiece contact is made, and wherein said error signal is operative to return said probe head to the most-recently traversed safety-reference point as the initiating point for attempted repetition of the involved measurement cycle.

17. The improvement of claim 16, in which said program is operative to retain the coordinates of the point at which said error signal is first developed and to determine whether a second error signal is encountered at the same coordinates as the first-developed error signal; said program being operative, upon determination of a second error signal at the same coordinates, to (1) return said probe head to said most-recently traversed safety-reference point and (2) thereupon to advance said probe head to the next-succeeding safety-reference point, thereby refraining from making the programmed measurement in the cycle which encountered said error signals.

18. The improvement of claim 17, in which said program includes one priority value assigned to the measurement cycle based on one safety-reference point and a different priority value assigned to the measurement cycle at another safety-reference point, said program being operative to advance the probe head from one to the next safety-reference point in the event that the same error signal is developed for repeated measurement cycles from a safety-reference point of one priority value and to displace the probe head past one or more other safety-reference points in the event that the same reference signal is developed for repeated measurement cycles from a safety-reference point of the different priority value.

* * * * *